A. PAYSEN.
FISH HOOK.
APPLICATION FILED OCT. 20, 1908.
959,587. Patented May 31, 1910.
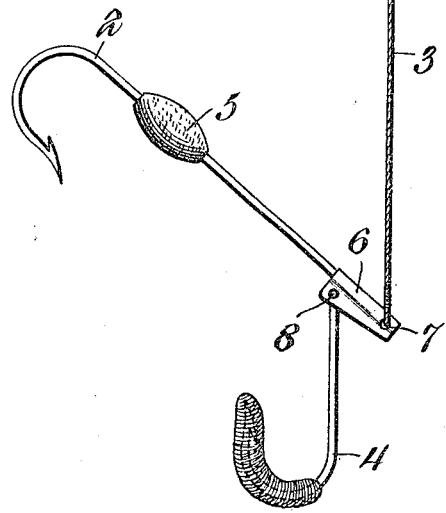
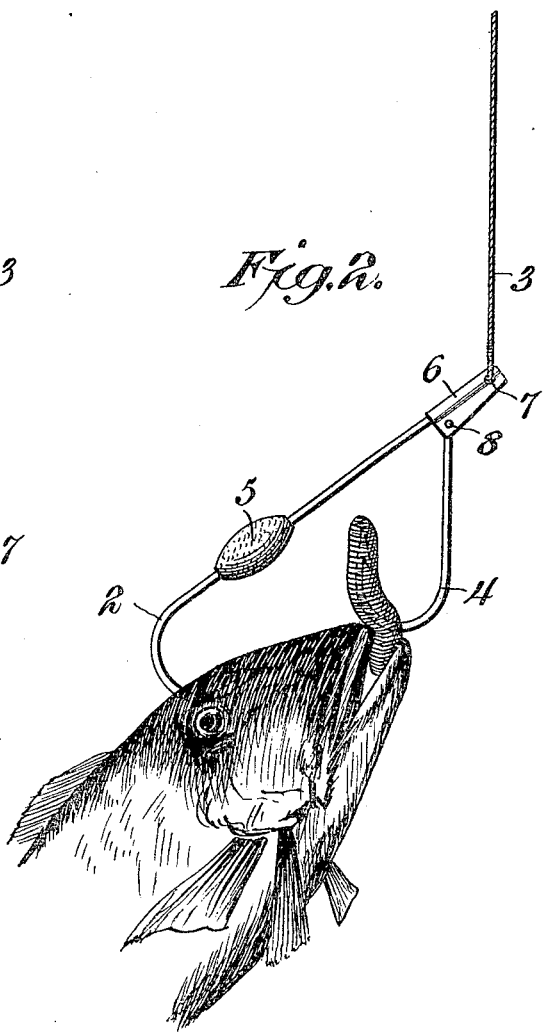
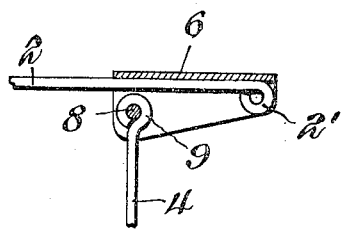
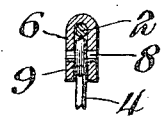
Andrew Paysen, Inventor,

UNITED STATES PATENT OFFICE.

ANDREW PAYSEN, OF ST. LOUIS, MISSOURI.

FISH-HOOK.

959,587.  Specification of Letters Patent.  Patented May 31, 1910.

Application filed October 20, 1908. Serial No. 458,695.

*To all whom it may concern:*

Be it known that I, ANDREW PAYSEN, a citizen of the United States, residing at St. Louis, State of Missouri, have invented a new and useful Fish-Hook, of which the following is a specification.

My invention relates to fish hooks, and particularly to that variety of fish hooks, in which nibbling at the bait causes a gaff hook to strike the fish.

The object of my invention is to provide a hook of this character, wherein the gaff hook shall be held up by means of a float, thus permitting the hook to be used under all of the usual circumstances in fishing, and whether the line is being trolled or supported immediately beneath the rod in a vertical position.

The invention consists in a composite or duplex hook composed of two hooks so pivoted to each other that when the bait hook is drawn upon by a fish, the other hook or gaff will be forced downwardly, and thus strike into the head of the fish, the gaff hook being held upwardly by means of a float attached thereto or formed thereon. This provision of a float-actuated hook is the important feature of my invention, as it permits the hooks to be used under all circumstances, whether the line is vertical or extends out merely horizontal as in trolling or even if the hooks are partially supported on the river bottom.

In the drawings:—Figure 1 is a side elevation of my improved hook, with the gaff raised. Fig. 2 is a like view, showing the action of the gaff when the bait is nibbled by a fish. Fig. 3 is an enlarged detail of the clip engaging the two hooks together partly in section. Fig. 4 is a transverse section of the same.

Similar reference numerals designate corresponding parts in all the figures of the drawings.

In the drawings, 2 designates the gaff hook having an eye 2' formed at one end to which the line 3 is attached. To the gaff hook is freely pivoted the bait hook 4, which hangs vertically in the position shown in Fig. 1 when the hook is in use. The gaff hook is provided with a float 5 of cork or other suitable material, which is preferably slipped over the shank of the gaff hook or otherwise formed thereon.

In order to attach the bait hook 4 to the gaff hook 2, I make use of a clip 6 of thin metal, which is folded at its middle around and over the shank of the hook 2 and forced firmly into engagement with said shank. The two sides of the clip form two projecting wings, between which the bait hook 4 is supported. One end of the clip is provided with a hole 7, which registers with the eye 2' for the passage of the line, while the other end is broadened, the two wings of the clip being connected by a rivet or pin 8. The upper end of the shank of the hook 4 is received between the two wings of the clip and is formed into an eye 9, which loosely incloses the rivet or pin 8 so that the hook 4 will hang entirely free.

In fishing, the device takes the position shown in Fig. 1, the hook 4 being vertical and the gaff raised by means of its float. Upon a fish nibbling at the bait on hook 4, or drawing down upon the same, the gaff will be thrown or drawn downward, and will strike the fish between the eyes, as shown in Fig. 2. It will be seen that any effort to detach the bait or to drag away portions thereof will cause the gaff hook to strike downward. It will also be seen that the float 5 holds the gaff hook up in the position shown in Fig. 1, whether the hook 4 be resting upon the bottom of the water or not, or whether the line 3 is vertical or at an angle. It will also be seen that the float acts to prevent the device from descending to the bottom of the stream, which would be the case if no floats were used and the gaff held in its upper position by means of a weight.

While I have shown only a pair of hooks, I wish it understood that the principle of my invention may be applied to a plurality of gaff hooks provided with floats constructed on the same principle as those shown and arranged so that a pull upon any one of the hooks throws the other hooks into adjacency with the pulled hook and gaffs the fish.

From the foregoing, it is thought that the construction, operation and many advantages of the herein described invention will be apparent to those skilled in the art, without further description, and it will be understood that various changes in the size, shape, proportion and minor details of construction, may be resorted to without departing from the spirit or sacrificing any of the advantages of the invention.

Having thus fully described my invention, what I claim as new, and desire to secure by Letters Patent, is:—

1. A device of the class described, comprising a bait hook, a gaff hook hinged to the bait hook, and a buoyant body carried by the gaff hook.

2. In a device of the class described, the combination with a bait carrying hook, of a gaff hook pivotally connected to the upper end of the bait hook, and a buoyant body applied to the gaff hook.

3. A device of the class described, comprising a pair of hooks hinged to one another, the points of which hooks project toward one another, and a buoyant body carried by one of said hooks.

4. A fishing device including a plurality of hooks pivotally connected to each other, and floating means acting to normally separate said hooks when in the water, said hooks being so arranged that when one of them is drawn upon by a fish, the opposed hook will be forced inward and downward into adjacency with the pulled hook.

5. A fishing device including a gaff hook having a float thereon and adapted to be attached at one end to a fishing line, and a bait hook having a pivotal connection to the shank of the gaff hook.

6. A fishing device including a gaff hook having a float thereon, a clip attached to the end of the gaff hook shank having at its outer end means for attachment to a fishing line, and a bait hook pivotally supported at its upper end from said clip.

7. A fishing device including a gaff hook having a float thereon, a clip attached to the end of the gaff hook shank having a folded portion embracing said shank and wings projecting therefrom, and a bait hook, the upper end of which is received between said wings and pivotally connected thereto, the outer end of said clip being provided with an opening for the attachment of a fishing line.

8. A fishing device including a gaff hook having an eye formed at one end thereof and provided with a float, a clip attached to the end of the gaff hook shank having a folded portion embracing said shank and wings projecting therefrom, said clip being perforated to register with the gaff hook eye, and a bait hook, the upper end of which is received within said wings and pivotally connected thereto.

9. A device of the class described comprising a hook adapted to receive fish bait, a clip pivotally arranged on the upper end of said hook, a gaff hook carried by the clip, and a buoyant member carried by the gaff hook.

In testimony, that I claim the foregoing as my own, I have hereto affixed my signature in the presence of two witnesses.

ANDREW PAYSEN.

Witnesses:
JOSEPH STEITZ,
GUSTAVE SINGER.